Feb. 23, 1965 D. L. BEATTY 3,170,990

TELEPHONE OPERATING DEVICE FOR DISABLED PERSONS

Filed March 14, 1963 3 Sheets-Sheet 1

INVENTOR.
David L. Beatty
BY John A. Hamilton
Attorney.

TELEPHONE OPERATING DEVICE FOR DISABLED PERSONS

Filed March 14, 1963

3 Sheets-Sheet 2

INVENTOR.
David L. Beatty
BY John A. Hamilton
Attorney.

TELEPHONE OPERATING DEVICE FOR DISABLED PERSONS

Filed March 14, 1963

INVENTOR.
David L. Beatty
BY
John A. Hamilton
Attorney.

3,170,990

TELEPHONE OPERATING DEVICE FOR DISABLED PERSONS

David L. Beatty, 10712 E. 84th Terrace, Raytown, Mo.
Filed Mar. 14, 1963, Ser. No. 265,124
2 Claims. (Cl. 179—1)

This invention relates to new and useful improvements in telephone operating devices, and has particular reference to a device for permitting operation and use of either a standard or dial-type telephone by disabled persons such as amputees or paralytics having only minimal usage of any portions of their bodies.

Considering dial-type phone operation, which includes also operation of a standard telephone, objects of the invention include the provision of a device actuated by a single switch, which may be easily adapted for operation by any portion of the user's body over which he is capable of exerting voluntary control, said device being operable by sequential operation of said switch to first place the phone in use by an operation similar to lifting the handset from the base or cradle of the telephone, second to turn the dial of the phone to dial "Operator," whereupon the user gives the number being called orally, and third to remove the phone from use by an operation similar to replacing the handset on the base of the phone. The telephone companies have no objection to giving this service, even on dial systems, so long as the disability of the caller is explained to the operator. The device may also include an electronic amplifier system having means for broadcasting the sound emanating from the handset receiver through a loudspeaker, and microphone means for picking up the voice of the user and feeding it back to the handset mouthpiece. In this case the device is equipped with switching means for turning on the amplifier system whenever the phone is placed in use as previously described.

Other objects are simplicity and economy of construction, efficiency and dependability of operation, ease and convenience of use by the disabled person, and adaptability for use without alteration or adaptation of any kind of the telephone instrument itself.

Figure 1:
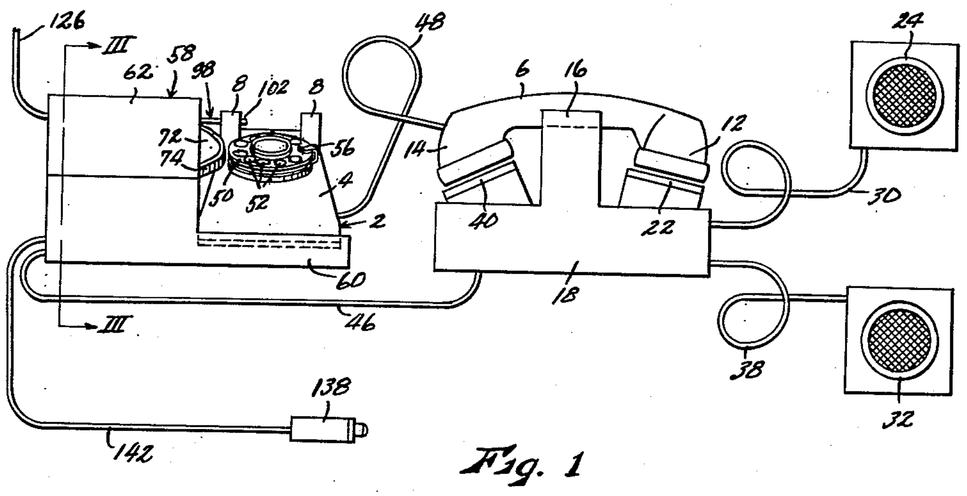
Figure 2:
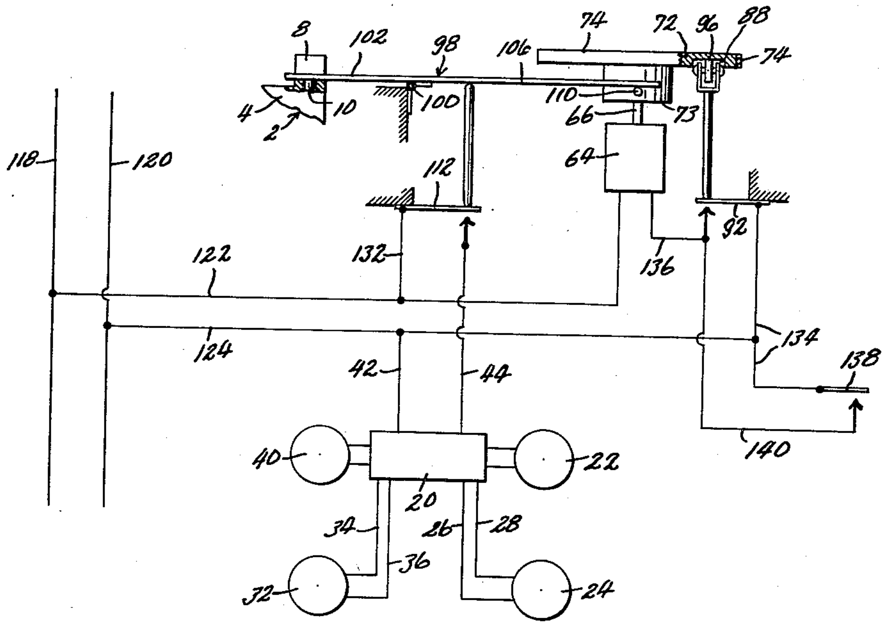
Figure 3:
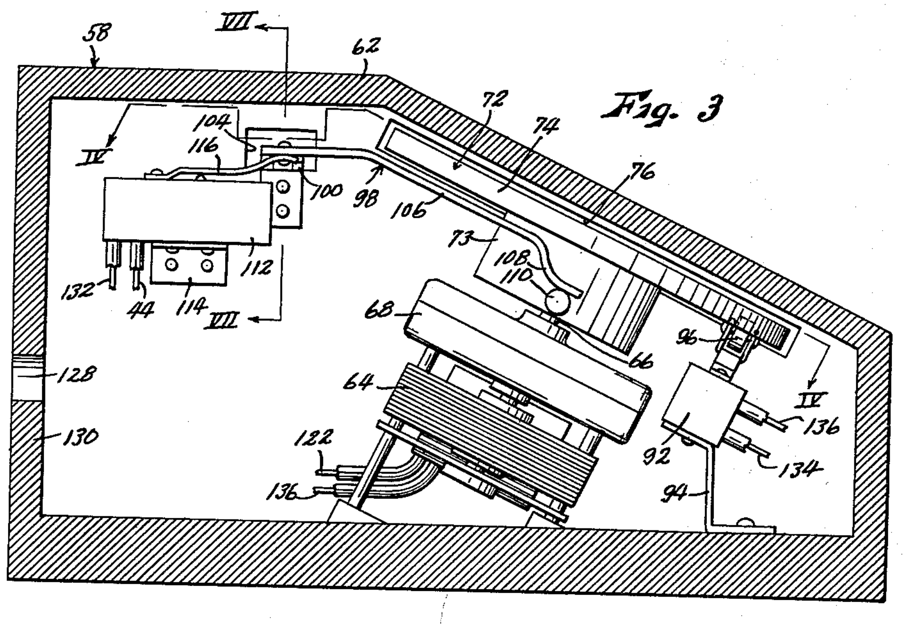
Figure 4:
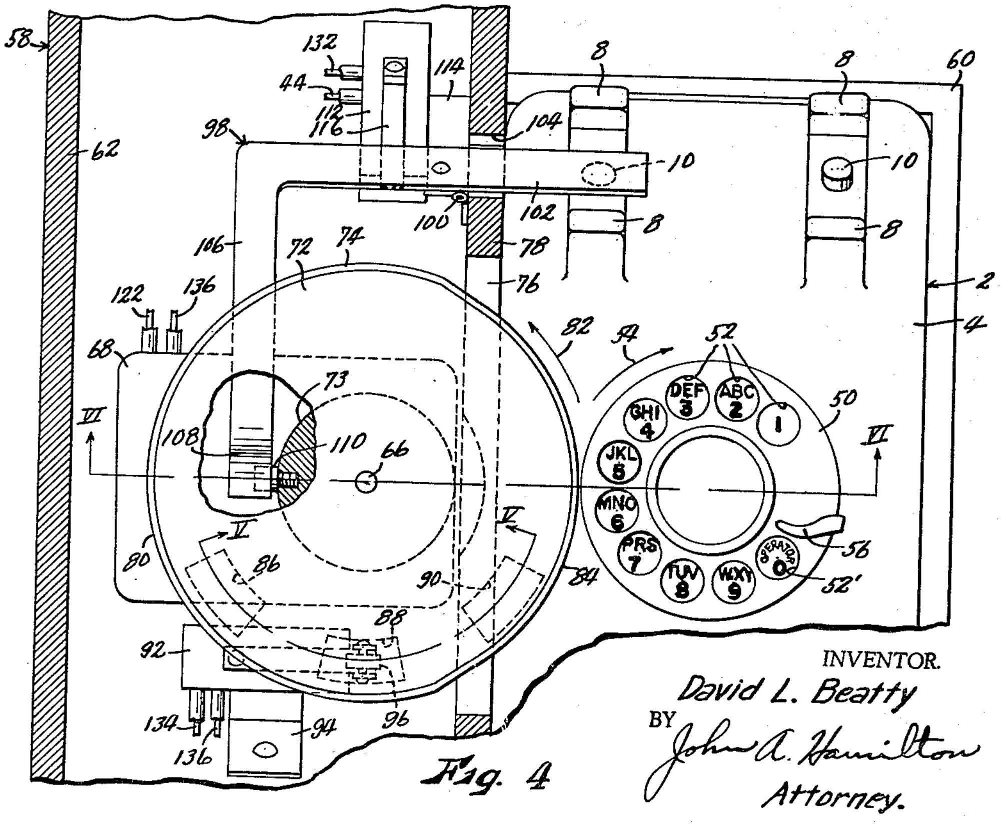
Figures 5, 6, 7, 8, 9:
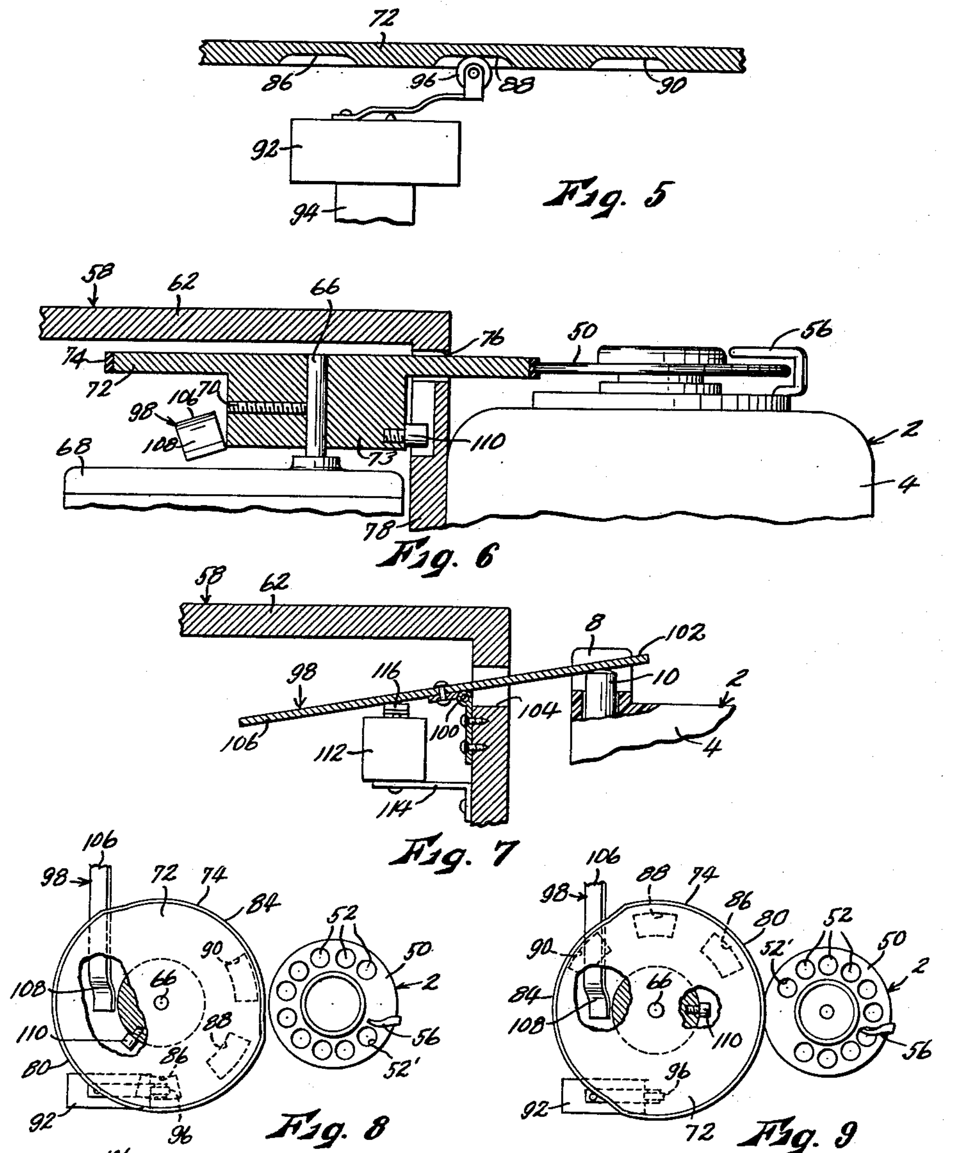
Figure 10:
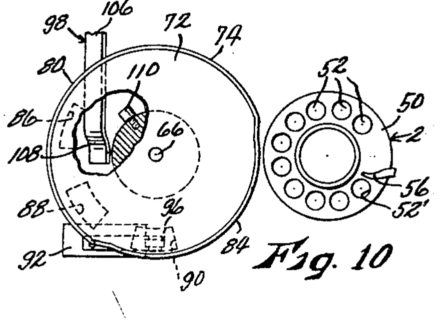

With these objects in view, as well as other objects which will appear in the course of the specification, reference will be had to the accompanying drawing, wherein:

FIG. 1 is a front elevational view of the components comprising a telephone operating device embodying the present invention, not to scale, FIG. 2 is a schematic diagram of the wiring and operating elements of the device, FIG. 3 is an enlarged sectional view of the case of the operating device, taken on line III—III of FIG. 1, FIG. 4 is a fragmentary sectional view taken on line IV—IV of FIG. 3, FIG. 5 is a fragmentary, laid-out sectional view taken on arcuate line V—V of FIG. 4, FIG. 6 is a fragmentary sectional view taken on line VI—VI of FIG. 4, FIG. 7 is a fragmentary sectional view taken on line VII—VII of FIG. 3, FIG. 8 is a fragmentary view similar to FIG. 4, but showing the parts in the position assumed after the actuating switch has been closed for the first time to place the phone in operation, FIG. 9 is similar to FIG. 8 but shows the parts in the position assumed after the actuating switch has been closed for the second time to start the dialing operation, the dialing operation being shown as partially completed, and FIG. 10 is similar to FIG. 9 but shows the dialing operation completed.

Like reference numerals apply to similar parts throughout the several views, and the numeral 2 applies generally to an ordinary telephone instrument of the dial type, said instrument including a base 4 and a handset 6. As is well known, said handset normally rests between cradle lugs 8 of the base, and in this position maintains the phone out of operation by depressing a pair of pushbuttons 10 carried by the base, and that the phone is placed in operation by lifting the handset to release said pushbuttons. It will be understood, however, that pressing and releasing either one of said pushbuttons will provide the desired operation.

Handset 6 includes the usual receiver 12 and mouthpiece 14. According to the present invention a pushbutton 10 is operated by separate means to be described below, and the handset is removed from the base. Said handset may be mounted in a suitable bracket conveniently disposed to the head of the disabled person to use the phone, or, as shown, may be supported in the cradle portion 16 of an amplifier case 18 containing an electronic amplifier system 20 (see FIG. 2), the details of which are standard and are not here shown. Said amplifier system includes a microphone 22 mounted in case 18 and positioned to pick up sounds emanating from phone receiver 12, whereby said sounds are amplified through a separate loudspeaker 24 connected to case 18 by a pair of lead wires 26 and 28 enclosed in a flexible cable 30. The amplifier system also includes a separate microphone 32 connected to the amplifier by a pair of lead wires 34 and 36 enclosed in a flexible cable 38, and operable to pick up the voice of the user and deliver it to a speaker 40 carried by case 18 adjacent the phone mouthpiece 14. Loudspeaker 24 and microphone 32 are disposed in positions convenient to the user. Power for amplifier 20 is supplied through a pair of lead wires 42 and 44 enclosed in a flexible cable 46, the circuit being controlled by switching means to be described below.

The telephone instrument base 4, which is connected to handset 6 by a flexible cable 48, has a circular dial 50 mounted for axial rotation on the upper forward portion thereof in the usual manner. The usual operation of the dial is well known, the user inserting his finger sequentially in the angularly spaced apertures 52 of said dial corresponding to the successive letters and digits of the phone number he is calling, in each case rotating the dial in the direction of the arrow 54 in FIG. 4 until his finger strikes the stop 56 affixed to the base, and then removing his finger to allow the dial to return to its normal position as shown in FIG. 4. If the first number dialed corresponds to the last aperture 52 of the dial, which is further designated by the numeral 52', the user is connected with the central office operator. It will be understood that the dial is equipped with a stop which prevents aperture 52' from being moved past finger stop 56.

The device also includes an operating case 58 which comprises a horizontal tray portion 60 adapted to support phone base 4 against horizontal movement as shown, and a box-like enclosure 62 directly adjacent said tray. Said operating case may be formed of wood, metal, or any other suitable material. An electric motor 64 is mounted in enclosure 62, and is operable when energized to turn a drive shaft 66 through a geared speed reducer 68, said drive shaft being parallel to the axis of phone dial 50. Fixed on the upper end of said drive shaft by set screw 70 (see FIG. 6) is a planar disc 72 having a peripheral facing 74 of any material suitable for producing frictional contact with the edge of phone dial 50, such as soft rubber. Said disc is coplanar with said phone dial when the telephone base 4 is supported in tray 60, and extends outwardly through a slot 76 formed therefor in the side wall 78 of enclosure 62 which is directly adjacent the telephone, to a point directly adjacent the phone dial. Referring to FIG. 4, it will be seen that one sector 80 of disc 72 is of sufficiently large diameter that when said disc is turned by motor 64 in the direction of arrow 82, it will frictionally engage and turn phone dial 50, as best shown in FIG. 6. The remaining portion of the disc periphery, designated as sector 84, is of such reduced diameter that it does not engage the phone dial. The peripheral length of sector 80 must be at least as great as the distance travelled by a point on the periphery of dial 50 when moving dial aperture 52′ adjacent finger stop 56 to dial "Operator."

A series of three angularly spaced sockets 86, 88 and 90 are formed in the lower face of disc 72, the total angular offset between first socket 86 and last socket 90 being less than the angular extent of disc sector 84. An electric by-pass switch 92 is mounted in enclosure 62 by means of a bracket 94, and is equipped with operating means including a roller 96 urged by spring pressure against the lower face of disc 72 and adapted to enter sockets 86, 88 and 90 successively as the disc is rotated. It will be understood that switch 92 is open when the disc is turned to allow roller 96 to enter any one of the sockets, and closed when the disc is turned to move said sockets out of registry with the roller.

An angled depressor lever 98 is hinged at 100 to side wall 78 of enclosure 62, said hinge being horizontal and disposed to the rear of disc 72. One leg 102 of said depressor extends outwardly from the enclosure through an aperture 104 provided therefor in said side wall and is disposed above one of the cradle pushbuttons 10 of the telephone instrument base. The other leg 106 of the depressor extends forwardly and is provided at its forward end with a curved cam follower portion 108 adapted to be engaged and elevated by a cam lug 110 affixed in the hub 73 of disc 72. When the disc is turned to a position wherein lug 110 engages and elevates depressor leg 106, as in FIGS. 3 and 4, the depressor is pivoted so that leg 102 thereof depresses and holds cradle pushbutton 10 of the telephone instrument down, thereby effectively "hanging up the phone" to remove it from use. When disc 72 is turned so that lug 110 does not engage the depressor, as in FIGS. 6 and 7, depressor leg 106 moves downwardly by gravity, and depressor leg 102 moves upwardly, releasing cradle pushbutton 10 to place the phone in service.

Another electrical switch 112 is mounted on enclosure side wall 78 by means of bracket 114, and is provided with operating means including an arm 116 pressed by spring pressure against the lower side of depressor leg 106 adjacent hinge 100. Switch 112 is open when lug 110 is supporting depressor leg 106, and closed when said lug is turned to disengage it from said depressor.

Referring to FIG. 2, a pair of electrical power line wires are indicated at 118 and 120. A pair of lead wires 122 and 124 are connected respectively to said line wires, and may be enclosed in a flexible cable 126 which may enter enclosure 62 through a hole 128 formed therefor in the back wall 130 of said enclosure (see FIG. 3). Wire 122 is connected to one terminal of motor 64, and is connected by wire 132 to one terminal of switch 112. Lead wire 44 of amplifier 20 is connected to the other terminal of switch 112. Lead wire 124 is connected to lead wire 42 of the amplifier, and is connected by wire 134 to one terminal of switch 92, the other terminal of said switch being connected by wire 136 to the second terminal of motor 64. Wire 134 is connected to one terminal of an actuating switch 138, the opposite terminal of said switch being connected to wire 136 by wire 140.

Switch 138 is disposed externally of operator case 58, the lead wires 134 and 142 thereof being enclosed in a flexible cable 142, and is adapted to be operated by the disabled person. While said switch is illustrated in FIG. 1 as a simple pushbutton, it will be understood that it may be of any of numerous types, selected to be usable by any particular disabled person by use of any portion of his body over which he is capable of exercising voluntary control. It could, for example, be of a type operable by a movement of the cheek of a disabled person, or operable by blowing through a tube placed in the person's mouth.

The normal out-of-use position of the parts is illustrated in FIG. 4. In this position, the midpoint of reduced sector 84 of disc 72 is disposed adjacent phone dial 50, and operating roller 96 of switch 92 is engaged in central socket 88 of said disc, so that said switch is open and motor 64 is inoperative. Also, lug 110 of the disc is then supporting depressor leg 106, so that depressor leg 102 depresses cradle pushbutton 25 to "hang up" the phone, and so that switch 112 is open to turn the amplifier 20 off.

To use the phone, the disabled person first closes actuating switch 138 momentarily. This completes a circuit from line wire 118 through wire 122, motor 64, wires 136 and 140, switch 138, and wires 134 and 124 to line wire 120. Motor 64, thus set in operation, turns disc 72 in the direction of arrow 82. The initial movement of said disc moves socket 88 thereof out of registry with roller 96, so that said roller is depressed to close switch 92. This completes a by-pass motor circuit from wire 118 through wire 122, motor 64, wire 136, switch 92, and wires 134 and 124 to wire 120, so that the motor continues to operate when switch 138 is opened, and will continue to operate until disc socket 86 registers with roller 96, whereupon said roller will engage in said socket and open switch 92. During this motion of the disc 72, lug 110 of the disc is disengaged from leg 106 of depressor 98, which thereupon falls by gravity so that depressor leg 102 is elevated to release cradle pushbutton 10 of the phone, thereby in effect "lifting the receiver" to place the phone in service. If the system is equipped with the amplifier 20, pivotal movement of depressor 98 at this time also closes switch 112 to complete the amplifier circuit from wire 118 through wires 122 and 132, switch 112, wire 44, amplifier 20 and wires 42 and 124 to wire 120. Said amplifier should be of a type not requiring any appreciable "warm-up" time.

The parts then have the position shown in FIG. 8, the larger sector 80 of disc 72 still not having engaged phone dial 50. The user then waits to hear the dial tone, either from phone receiver 12 or from loudspeaker 24. Then, to dial "Operator," the user again closes actuating switch 138 momentarily, thereby setting motor 64 in operation to turn disc 72, the operation being continued after release of switch 138 by the closure of switch 92, as previously described. During this rotation of the disc, enlarged sector 80 thereof frictionally engages and turns phone dial 50, the position of the parts at approximately the midpoint of the dialing operation being illustrated in FIG. 9. The peripheral linear extent of disc sector 80 must of course be sufficiently great to turn dial 50 to bring aperture 52′ thereof adjacent the stop 56. If movement of the dial is arrested by its limiting stop while it is still engaged by disc 72, said disc will simply continue to turn, its facing 74 sliding against the edge of the dial. Disc 72 continues to turn until socket 90 thereof registers with roller 96, whereupon switch 92 opens and the system is again at rest. At this time the relative position of the parts is shown in FIG. 10, it being noted that disc sector 80 has moved out of engagement with the phone dial, so that said dial returns to its normal position. The user is then connected with the central office operator, and can give the number he desires to call orally. Telephone companies generally have no objection to rendering this service for disabled patrons.

After the call is completed, the user closes actuating switch 138 momentarily for a third and last time, thereby setting motor 64 in operation as previously described to turn disc 72 until socket 88 thereof registers with roller 96 to open switch 92, thereby shutting off the motor. During this movement, lug 110 engages cam follower portion 108 of depressor 98 and elevates leg 106 of said depressor. This causes depressor leg 102 to depress cradle pushbutton 10 of the telephone to "hang up" and also opens switch 112 to break the circuit to amplifier 20.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. In combination with a telephone instrument including a base having thereon a pushbutton operable when depressed to remove said telephone from service and when released to place said telephone in service, and a dial capable of being turned to connect the telephone user with the central office operator, a telephone operating device for use by a disabled person, said device comprising:

(*a*) a case adapted to support said instrument base, (*b*) electrically actuated operating means carried by said base and operable on successive actuations to perform, in a continuously repeated sequence, the functions of first releasing said pushbutton, second turning said dial to connect the user with the central office operator, and third to depress said pushbutton, (*c*) an actuating switch adapted to be operated by a disabled person, (*d*) an operative electrical circuit including a source of electrical power, said operating means, and said actuating switch, (*e*) a by-pass switch in said operative circuit and operable when closed to complete said circuit independently of said actuating switch, and (*f*) means actuated by said operating means to close said by-pass switch at the beginning of each of said functions performed by said operating means, and to open said by-pass switch upon completion of each said function.

2. The combination as recited in claim 1 wherein said operating means comprises:

(*a*) a disc carried rotatably in said case in coplanar relation with said telephone dial and directly adjacent said dial, said disc having a sector of larger diameter operable to engage frictionally and turn said dial as said disc is turned, and a sector of smaller diameter inoperable to engage said dial, (*b*) a pushbutton depressor carried movably in said case and operable when moved in one direction to depress said pushbutton and when moved in the opposite direction to release said pushbutton, (*c*) cam means carried by said disc and operable to engage and move said depressor to depress said pushbutton when the approximate midpoint of said smaller disc sector is directly adjacent said telephone dial, the angular extent of said smaller disc sector being such that said cam means is disengaged from said depressor at all times during which the larger disc sector engages said telephone dial, (*d*) an electric motor operable to turn said disc, said motor being disposed in said operative electric circuit, and (*e*) means operable by rotation of said disc to open said by-pass switch at three angularly spaced apart points in the rotation of said disc, said disc being positioned, when at the center of said three points, with the approximate midpoint of the smaller sector thereof directly adjacent the telephone dial, the angular extent of said disc including all three of said points being less than the angular extent of said smaller disc sector, but greater than the angle through which said disc must be turned to move said cam means into and out of engagement with said depressor as said disc is rotated.

References Cited by the Examiner

UNITED STATES PATENTS

| | | | |
|---|---|---|---|
| 2,674,658 | 4/54 | West | 179—90 |
| 2,885,477 | 5/59 | Smith | 179—1 |
| 3,124,650 | 3/64 | Rostad | 179—5 |
| 3,136,855 | 6/64 | Provost | 179—5 |

ROBERT H. ROSE, *Primary Examiner.*